United States Patent
Pogrebinsky

(10) Patent No.: US 11,503,028 B2
(45) Date of Patent: Nov. 15, 2022

(54) SECURE REMOTE TROUBLESHOOTING OF PRIVATE CLOUD

(71) Applicant: Microsoft Technology Licensing, LLC, Redmond, WA (US)

(72) Inventor: Vladimir Pogrebinsky, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 212 days.

(21) Appl. No.: 16/826,762

(22) Filed: Mar. 23, 2020

(65) Prior Publication Data
US 2021/0297417 A1 Sep. 23, 2021

(51) Int. Cl.
*H04L 9/40* (2022.01)
*G06F 21/30* (2013.01)

(52) U.S. Cl.
CPC .......... *H04L 63/10* (2013.01); *H04L 63/1425* (2013.01)

(58) Field of Classification Search
CPC ... H04L 63/10; H04L 63/1425; H04L 63/101; H04L 63/104; H04W 12/03; H04W 4/023; H04W 88/182
See application file for complete search history.

(56) References Cited

U.S. PATENT DOCUMENTS

| | | | | |
|---|---|---|---|---|
| 10,846,788 | B1* | 11/2020 | Klein | H04L 47/783 |
| 2008/0082658 | A1* | 4/2008 | Hsu | H04L 51/212 |
| | | | | 709/224 |
| 2012/0216133 | A1* | 8/2012 | Barker | G06F 21/629 |
| | | | | 715/760 |
| 2015/0296377 | A1* | 10/2015 | Sheu | H04W 12/06 |
| | | | | 380/279 |
| 2018/0143961 | A1* | 5/2018 | Thomas | H04L 65/4015 |

(Continued)

FOREIGN PATENT DOCUMENTS

EP 2846208 A2 3/2015

OTHER PUBLICATIONS

Hsu et al., "Profit-Driven Service-Chain Deployment for EDA Requests on Private Cloud," 2020 IEEE 9th International Conference on Cloud Networking (CloudNet) Year: 2020 | Conference Paper | Publisher: IEEE.*

(Continued)

*Primary Examiner* — Roderick Tolentino
(74) *Attorney, Agent, or Firm* — Newport IP, LLC; Jacob P. Rohwer

(57) ABSTRACT

Techniques for secure remote troubleshooting of a private cloud are disclosed herein. One example technique includes identifying that a received command is received via an established servicing connection between the private cloud and the public cloud. The example technique can then include determining, based on a list of access authorizations corresponding to the servicing connection, whether access to the computing service or computing resource to which the command is directed is allowed from the public cloud via the servicing connection. In response to determining that access to the computing service or computing resource is not allowed, the command is prevented from being executed in the private cloud, and thus avoiding unauthorized access to the computing service or computing resource in the private cloud.

12 Claims, 11 Drawing Sheets

(56) References Cited

U.S. PATENT DOCUMENTS

| | | | |
|---|---|---|---|
| 2019/0166125 A1* | 5/2019 | Bender | H04L 63/02 |
| 2019/0373008 A1 | 12/2019 | Brandwine et al. | |
| 2020/0067878 A1* | 2/2020 | Pednekar | G06F 21/44 |
| 2020/0177591 A1* | 6/2020 | Pogrebinsky | H04L 67/1001 |
| 2020/0252475 A1* | 8/2020 | Marndi | G06F 9/45558 |
| 2020/0259795 A1* | 8/2020 | Koshal | H04L 41/083 |

OTHER PUBLICATIONS

Liu et al., "Implement of a Light-Weight Integrated Virtualized Environment Manager for Private Cloud Computing," 2012 International Conference on Computer Science and Service System Year: 2012 | Conference Paper | Publisher: IEEE.*

"International Search Report and Written Opinion Issued in PCT Application No. PCT/US21/015972", dated May 11, 2021, 12 Pages.

* cited by examiner

SECURE REMOTE TROUBLESHOOTING OF PRIVATE CLOUD

BACKGROUND

Remote or "cloud" computing typically utilizes a collection of remote servers to provide computing, data storage, electronic communications, or other cloud services. A computer network can interconnect the remote servers as nodes to form a computing fabric with one or more computing clusters. During operation, multiple nodes in the computing fabric can cooperate to provide a distributed computing environment that facilitates execution of user applications in order to provide cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing systems or "clouds" can be public or private. Public clouds typically offer subscriptions of cloud services to a general public. Examples of public clouds include Microsoft Azure®, Amazon Web Services®, and Google Compute®. On the other hand, corporations, universities, government entities, and other organizations can often have dedicated servers, datacenters, or other computing facilities configured to deploy cloud services for internal use only. Such a cloud computing system is often referred to as a private cloud. In a particular example, a grocery chain may deploy one or more servers in each grocery store and interconnect the servers via a private network or a virtual private network. The multiple servers can form a "fleet" that can be used to execute suitable applications to provide a computing fabric of a private cloud with product/sales reporting, inventory reporting, record keeping, or other suitable functionalities.

Private clouds are typically isolated from external networks for data security, privacy, or other business reasons. However, such isolation can pose certain difficulties for troubleshooting and resolving technical issues because operators of private clouds are typically insufficiently familiar with potential hardware/software issues in the private clouds. For instance, the example grocery chain above can deploy the private cloud by purchasing and installing servers that execute a platform software (e.g., Azure Stack®) provided by a software provider (e.g., Microsoft Corporation of Redmond, Wash.). During operation, one or more of the deployed servers may experience various hardware/software issues. Staff at the grocery chain, however, may have insufficient technical knowledge to troubleshoot complex issues involving the platform software and other hardware/software components. However, due to the isolation of the private cloud, developers or engineers at the software provider (or other external entities) do not have access to the servers in the private cloud for performing diagnostics or repair operations via a public cloud or other computing systems.

Several embodiments of the disclosed technology can address some aspects of the foregoing drawbacks by providing a cloud architecture that allows remote servicing of servers in a private cloud by a software provider or other suitable entities external to the private cloud. The cloud architecture can allow an operator of the private cloud to maintain control over data exchanged by the software provider with the private cloud and a degree of privacy that is sacrificed in the private cloud for servicing. As such, the operator of the private cloud can leverage expertise of the software provider on a per-need basis while avoid giving full control of the private cloud to the software provider or other external entities. In certain embodiments, the software provider can provide such remote servicing from a public cloud connected to the private cloud via a public network. In other embodiments, such remote servicing can be via a server in the private cloud that acts as a supervising station or "fleet head" for other servers in the private cloud or in other suitable manners.

In one implementation, the cloud architecture can include a dispatcher service deployed in the private cloud and configured to manage and monitor servicing operations performed by the software provider or other external entities in the private cloud. For instance, the dispatcher service can be configured to receive a request from an operator of the private cloud for initiating a servicing connection to a software provider. A servicing connection generally refers to a network connection associated with one or more servicing sessions in the private cloud. A servicing connection can be established via a suitable secure communication protocol and allow transmission of data, such as authentication credentials, commands, execution results, and/or other suitable types via the servicing connection. One example servicing connection can be established using the Secure Hypertext Transfer Protocol ("HTTPS"), HTTP over Transport Layer Security ("TLS"), or other suitable types of protocol.

In response to receiving the request from the operator, the dispatcher service can query the operator for a list of access authorizations corresponding to the servicing connection. The access authorizations can include a list of computing services (e.g., support services, admin services, etc.) or computing resources (e.g., servers, network storage devices, etc.) that an external entity (e.g., an engineer at the public cloud) is allowed (or prohibited) to access via the servicing connection. For instance, when a particular server in the private cloud is experiencing technical issues, the operator can limit the access authorizations for the servicing connection to the server but prohibit access to any other servers, network devices, or other components of the private cloud.

Various techniques may be utilized to query the operator. For instance, the dispatcher service can be configured to provide a graphical user interface ("GUI") that provides a list of computing services or computing resources in the private cloud as options for the operator. In turn, the operator can select one or more of the provided options by, for example, clicking a check box next to an option. The operator can then finalize the selection by actuating a button such as "Apply" or "Done" on the GUI. In other examples, the list of access authorizations can be provided as a configuration file, a text document, or in other suitable manners.

Upon receiving the list of access authorizations, the dispatcher service can be configured to initiate a call to a service gateway at a public cloud associated with the software provider for establishing the servicing connection. In certain embodiments, initiation of the servicing connection can be one-directional. As such, the servicing connection can be established with an outbound call by the dispatcher service to the service gateway of the public cloud but not in the reverse direction by the service gateway or other entities external to the private cloud. Any inbound requests for establishing network connections can be denied by the dispatcher service or other suitable services at the private cloud. In other embodiments, initiation of the servicing connection can be bi-directional. For example, the dispatcher service can receive a request for establishing or reestablishing a servicing connection from the service gateway. The dispatcher service can authenticate the request via digital certificates, authorization tokens, or other suitable authentication credentials. Upon successful authentication, the dispatcher service can allow the servicing connection to be established with the service gateway at the software provider. In further embodiments, initiation of the servicing connection can also be facilitated by a subscription service, a network service, an encryption service, or other suitable services at the private cloud.

Upon successful initiation, the servicing connection can be established between the service gateway at the public cloud and the dispatcher service at the private cloud. An administrator, engineer, developer, technical support staff, or other suitable persons or entities at the software provider can then be requested to utilize the established servicing connection between the public cloud and the private cloud to troubleshoot one or more computing services or computing resources at the private cloud. For example, an engineer at the software provider can transmit a command (e.g., a ping) directed to a server in the private cloud to the dispatcher service at the private cloud. In response, the dispatcher service can verify that the command is received from the servicing connection and determine whether access to the server in the private cloud is indicated in the received list of access authorizations corresponding to the servicing connection.

In response to determining that access to the server in the private cloud is allowed according to the received access authorizations, the dispatcher service can be configured to identify a corresponding computing service or computing resource in the private cloud and transmit the command to, for example, the server in the private cloud. Upon execution of the command by the server, execution results can be transmitted to the dispatcher service and relayed to the engineer via the servicing connection and the servicing gateway. As such, using the servicing connection, the engineer at the software provider can perform diagnostics on the server in the private cloud, perform repair actions such as modifying configurations on the server, install/reinstall software drivers, or rebooting the server. Thus, technical knowledge of the software provider can be leveraged to resolve technical issues at the private cloud in a controlled manner. In response to determining that access to the server in the private cloud is not allowed according to the received access authorizations, the received command can be discarded to prevent access beyond what is indicated in the list of access authorizations. As such, data security and privacy in the private cloud can be efficiently controlled while allowing the software provider sufficient access for troubleshooting issues in the private cloud.

In certain implementations, repair functionalities and corresponding computing services can be activated in layers or sequences on the server in the private cloud. For example, a command dispatcher can be executed in a container on the server in the private cloud to receive and execute commands from the software provider. However, in certain situations, the command dispatcher may be unavailable due to container error or other hardware/software issues. To address such situations, a command dispatcher recovery service can be placed on the server (or a virtual machine hosted thereon). The command dispatcher recovery service can be pre-configured with a list of endpoints (e.g., the service gateway at the software provider) to connect to. In operation, the command dispatcher recovery service can reach outside of the server when the container-hosted command dispatcher is offline. As such, the engineer from the software provider can first recover the command dispatcher using the command dispatcher recovery service, and then use the command dispatcher for other diagnostic or repair operations.

In other implementations, the dispatcher service can also be configured to log all incoming and outgoing communications via the established servicing connection until the servicing connection is closed. For instance, the dispatch service can be configured to create records or "traces" of any received commands to the server, results of access authorization determinations, and the execution results transmitted to the software provider via the servicing connection. Such records can be archived in, for instance, a network storage in the private cloud or other suitable locations. The operator of the private cloud can then analyze the archived records for auditing, maintenance, forensic analysis after security incidents, or other suitable uses.

Several embodiments of the disclosed technology can thus allow the operator of the private cloud to maintain control over data exchanged by the software provider with the private cloud and a degree of privacy that is sacrificed in the private cloud. For example, by defining and limiting access to computing services or computing resources according to the list of access authorizations, the operator of the private cloud can limit a scope of access by the software provider. Using the list of access authorizations, the dispatcher service can prevent execution of commands directed to non-authorized computing services or computing resources. As such, the operator of the private cloud can leverage expertise of the software provider on a per-need basis while avoid giving full control of the private cloud to the software provider.

DETAILED DESCRIPTION

Figure 1:
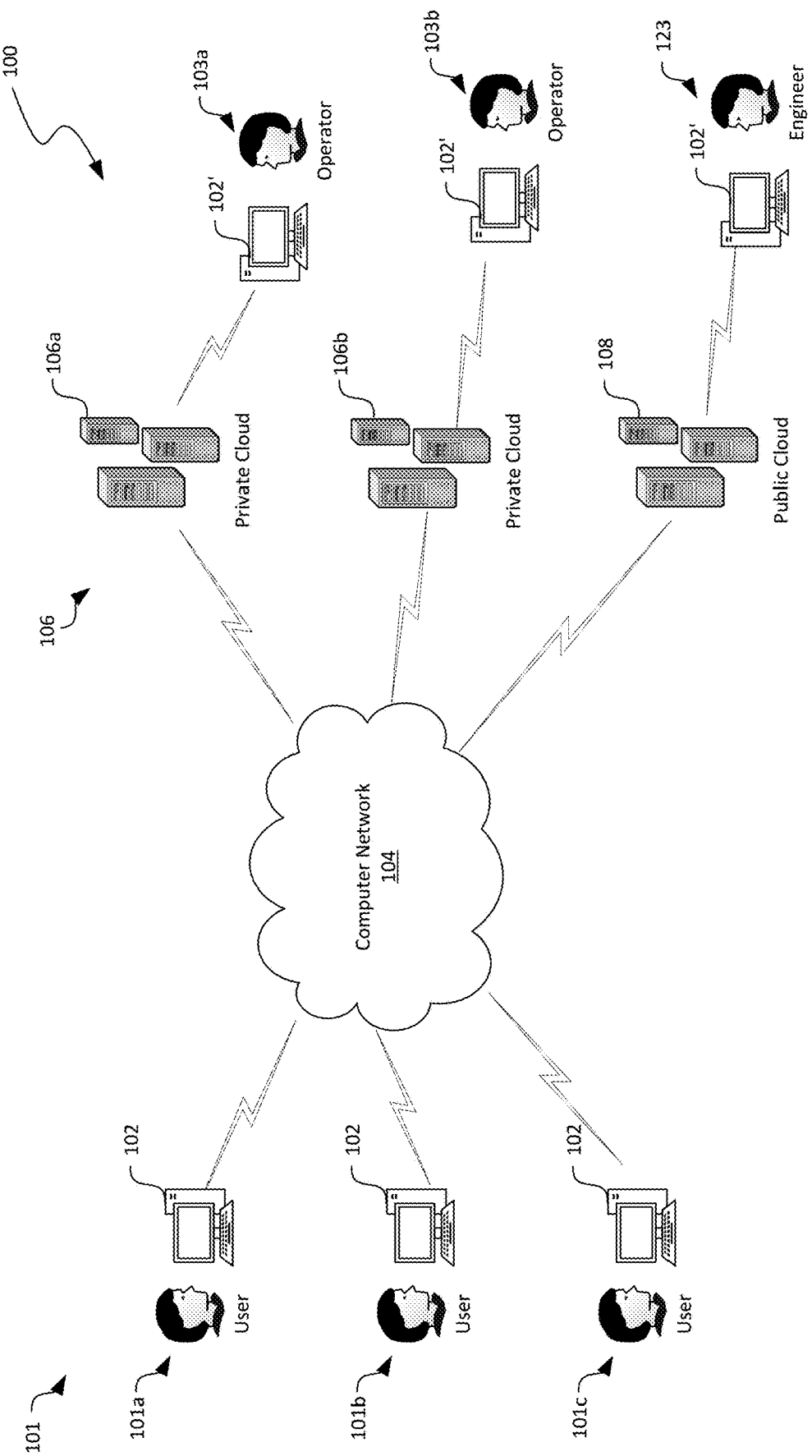
FIG. 1 is a schematic diagram of a hybrid cloud computing system in accordance with embodiments of the disclosed technology.

Certain embodiments of computing systems, devices, components, modules, routines, and processes for secure remote troubleshooting of a private cloud from a public cloud are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-6.

As used herein, the term "cloud computing system" or "cloud" generally refers to a computer system configured to provide various cloud computing services via a computer network. A cloud computing system can include multiple network devices interconnecting a large number of remote servers or nodes to one another and/or to external networks (e.g., the Internet). In one example, a cloud computing system can include multiple containers, racks, or other suitable enclosures each holding multiple servers in a cloud computing datacenter (or portions thereof). The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

As used herein, the term "public cloud" or "public cloud computing system" generally refers to a cloud computing system that provides subscription of cloud services to the general public. Examples of public cloud include Microsoft Azure®, Amazon Web Services®, and Google Compute®. In contrast, the term "private cloud" or "private cloud computing system" generally refers to a cloud computing system for internal use of and under strict access control of an organization due to security, data protection, privacy, or other concerns. For example, a grocery chain may deploy one or more servers in each grocery store and interconnect the servers via a private network or a virtual private network. The multiple servers can form a "fleet" that can be used to execute suitable applications to provide a computing fabric of a private cloud with product/sales reporting, inventory reporting, record keeping, or other suitable functionalities. A public cloud or users outside of an organization typically do not have access to a private cloud of the organization. The term "hybrid cloud" generally refers to a cloud computing system having a portion being a public cloud interconnected to another portion that is a private cloud via a computer network. As discussed in more detail below, several embodiments of the disclosed technology can allow secure remote troubleshooting of a private cloud via a public cloud interconnected to the private cloud via a computer network.

Also used herein, the term "cloud computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "resource provider" generally refers to a cloud service that is configured to provide or make available one or more resources of a public or private cloud. The one or more resources can be deployed and managed through, for example, a resource manager accessible via a user portal. In certain embodiments, a resource provider can be configured to offer representational state transfer ("REST") Application Programming Interfaces ("APIs") for working with associated resources. For example, a resource provider can be configured to deploy a key vault for storing keys and credentials. This resource provider can provide an example resource type called "vault" for creating a key vault, and another example resource type called "vault/secret" for creating a secret in the key vault. In other embodiments, resource providers can also provide computing resources (e.g., virtual machines), storage resources (e.g., network storage), network resources (e.g., virtual networks), database resources (e.g., database servers), or other suitable types of resources.

Private clouds are typically isolated from external networks for data security, privacy, or other business reasons. However, such isolation can pose certain difficulties for troubleshooting and resolving technical issues because operators of private clouds are not sufficiently familiar with potential hardware/software issues in the private clouds. For instance, the example grocery chain above can deploy the private cloud by purchasing and installing servers that execute a platform software provided by a software provider. During operation, one or more of the deployed servers may experience various hardware/software issues. Staff at the grocery chain, however, may have insufficient technical knowledge to troubleshoot complex issues involving the platform software or other hardware/software components. However, due to the isolation of the private cloud, developers or engineers at the software provider may not have access to the servers in the private cloud from a public cloud for performing diagnostics or repair operations.

Several embodiments of the disclosed technology can address some aspects of the foregoing drawbacks by providing a cloud architecture that allows remote servicing of servers in a private cloud by a software provider or other suitable entities external to the private cloud from a public cloud. The cloud architecture can allow an operator of the private cloud to maintain control over data exchanged by the software provider with the private cloud and a degree of privacy that is sacrificed in the private cloud. As such, the operator of the private cloud can leverage expertise of the software provider on a per-need basis while avoid giving full control of the private cloud to the software provider. In certain embodiments, the software provider can provide such remote servicing via a public cloud connected to the private cloud via a public network. In other embodiments, such remote servicing can be via a server in the private cloud that acts as a supervising station or "fleet head" for other servers in the private cloud, as described in more detail below with reference to FIGS. 1-6.

FIG. 1 is a schematic diagram illustrating a hybrid cloud computing system 100 in accordance with embodiments of the disclosed technology. As shown in FIG. 1, the hybrid cloud computing system 100 can include a public cloud 108 and one or more private clouds 106 interconnected with client devices 102 of users 101 via a computer network 104. The computer network 104 can include an enterprise intranet, a social network, the Internet, or other suitable types of network. One example computer network 104 is described in more detail below with reference to FIG. 2A.

Even though particular components and associated arrangements of the hybrid cloud computing system 100 are shown in FIG. 1, in other embodiments, the hybrid cloud computing system 100 can include additional and/or different components. For example, in the illustrated embodiment, the hybrid cloud computing system 100 includes two, i.e., first and second private clouds 106a and 106b. In other embodiments, the hybrid cloud computing system 100 can include three, four, or any other suitable number of private clouds 106. In further embodiments, the hybrid cloud computing system 100 can also include web servers, domain name servers, or other suitable components.

The client devices 102 can individually include a computing device that facilitates access to the public cloud 108 and/or the private clouds 106 via the computer network 104 by users 101. For example, in the illustrative embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the hybrid cloud computing system 100 can facilitate any suitable number of users 101 access to the public cloud 108 and/or the private clouds 106 via the computer network 104.

The public cloud 108 and the private clouds 106 can be individually configured to provide subscriptions of certain cloud services to the users 101. As shown in FIG. 1, the public cloud 108 is open to the general public. As such, all users 101 can have access to the public cloud 108. On the other hand, the private clouds 106 can have strict access control. As such, only users 101 who are authorized may access the private clouds 106. For example, first and second users 101a and 101b can be authorized to access the first and second private clouds 106a and 106b, respectively, but not the third user 101c. As such, the third user 101c has no access to either of the first or second private cloud 106a and 106b while having access to the public cloud 108.

As shown in FIG. 1, first and second operators 103a and 103b can manage the first private cloud 106a and the second cloud 106b, respectively, via additional client devices 102'. However, the engineer 123 of the public cloud 108 has no access to either of the private clouds 106. As described in more detail below, several embodiments of the disclosed technology are directed to implementing a resource provider (referred to below as "a dispatcher service") at the private cloud 106 that can interface with a service gateway 124 (shown in FIG. 3A) at the public cloud 108. The dispatcher service 134 (shown in FIG. 3A) can allow the engineer 123, a developer, a technical support staff, or other suitable types of entity at the public cloud 108 to access certain computing services or computing resources at the private clouds 106. As such, the engineer 123 at the public cloud 108 can perform remote troubleshooting of hardware/software issues at the private clouds 106 via the dispatcher service. Example components of a cloud computing system suitable for either the public cloud 108 or the private clouds 106 are described in more detail below with reference to FIGS. 2A-2B.

Figure 2A:
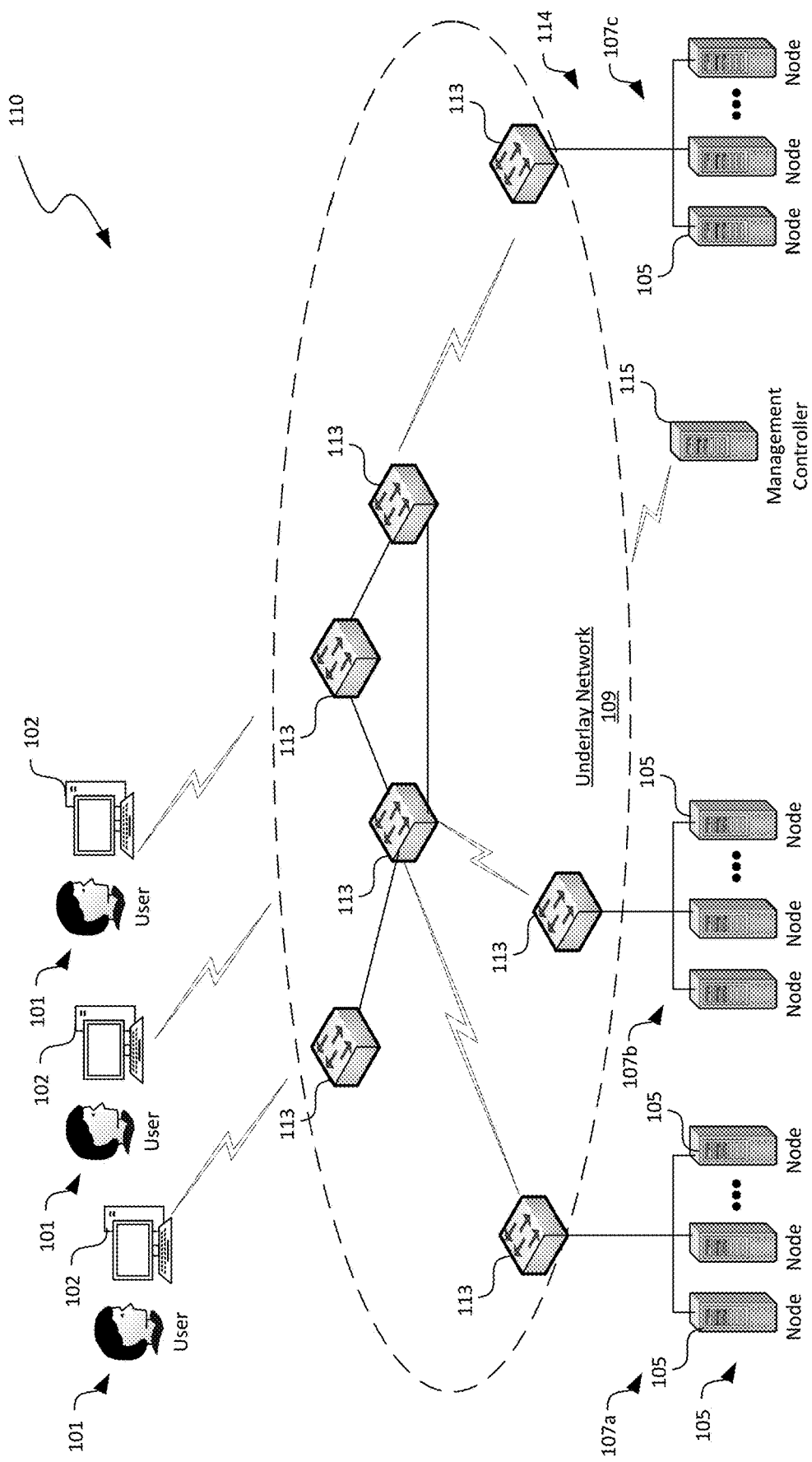
FIG. 2A is a schematic diagram illustrating a cloud computing system suitable for a public cloud or a private cloud in the hybrid cloud computing system in FIG. 1 in accordance with embodiments of the disclosed technology.

FIG. 2A is a schematic diagram illustrating a cloud computing system 110 suitable for either the public cloud 108 or the private clouds 106 of FIG. 1 in accordance with embodiments of the disclosed technology. As shown in FIG. 2A, the cloud computing system 110 can include an underlay network 109 interconnecting a plurality of client devices 102 associated with users 101 and a computing fabric 114. Even though particular components of the cloud computing system 110 are shown in FIG. 2A, in other embodiments, the cloud computing system 110 can also include additional and/or different constituents. For example, the cloud computing system 110 can also include additional computing fabrics (not shown) interconnected with one another, network storage devices, utility infrastructures, and/or other suitable components.

As shown in FIG. 2A, the underlay network 109 can include one or more physical network devices 113 that interconnect the users 101 and the computing fabric 114. Examples of the network devices 113 can include routers, switches, firewalls, load balancers, or other suitable network components. Even though particular connection scheme is shown in FIG. 2A for illustration purposes, in other embodiments, the network devices 113 can be operatively coupled in a hierarchical, flat, "mesh," or other suitable topologies.

Also shown in FIG. 2A, the computing fabric 114 can include a plurality of nodes 105 operatively coupled to one another by the network devices 113. In certain embodiments, the nodes 105 can individually include a processor, a physical server, or several physical servers. In other embodiments, the nodes 105 can also include a virtual server or several virtual servers. The nodes 105 can be organized into racks, availability zones, groups, sets, computing clusters, or other suitable divisions. For example, in the illustrated embodiment, the nodes 105 are grouped into three computing clusters 107 (shown individually as first, second, and third computing clusters 107a-107c, respectively), which are operatively coupled to corresponding network devices 113 in the underlay network 109. Even though three computing clusters 107 are shown in FIG. 2A for illustration purposes, in other embodiments, the computing fabric 114 can include one, two, eight, sixteen, or any other suitable numbers of computing clusters 107 with similar or different components and/or configurations.

As shown in FIG. 2A, the computing fabric 114 can also include a management controller 115 configured to monitor, control, or otherwise manage operations of the nodes 105 in the computing clusters 107. For example, in certain embodiments, the management controller 115 can include a fabric controller configured to manage processing, storage, communications, or other suitable types of hardware resources in the computing clusters 107 for hosting cloud services. In other embodiments, the management controller 115 can also include a datacenter controller, application delivery controller, or other suitable types of controller. In the illustrated embodiment, the management controller 115 is shown as being separate from the computing clusters 107. In other embodiments, the management controller 115 can include one or more nodes 105 in the computing clusters 107. In further embodiments, the management controller 115 can include software services hosted on one or more of the nodes 105 in the computing clusters 107.

In operation, the users 101 can request deployment of a cloud service or consumption of a computing resource via, for example, a user portal (not shown). For example, a user 101 can request instantiation of a virtual machine 145 (shown in FIG. 2B) in the cloud computing system 110. In response to receiving the request from the user 101, the management controller 115 can verify a subscription level of the user 101, and provision for instantiation of a virtual machine upon verification. The management controller 115 can then cause one or more of the nodes 105 to instantiate the requested virtual machine 145, as described in more detail below with reference to FIG. 2B.

Figure 2B:
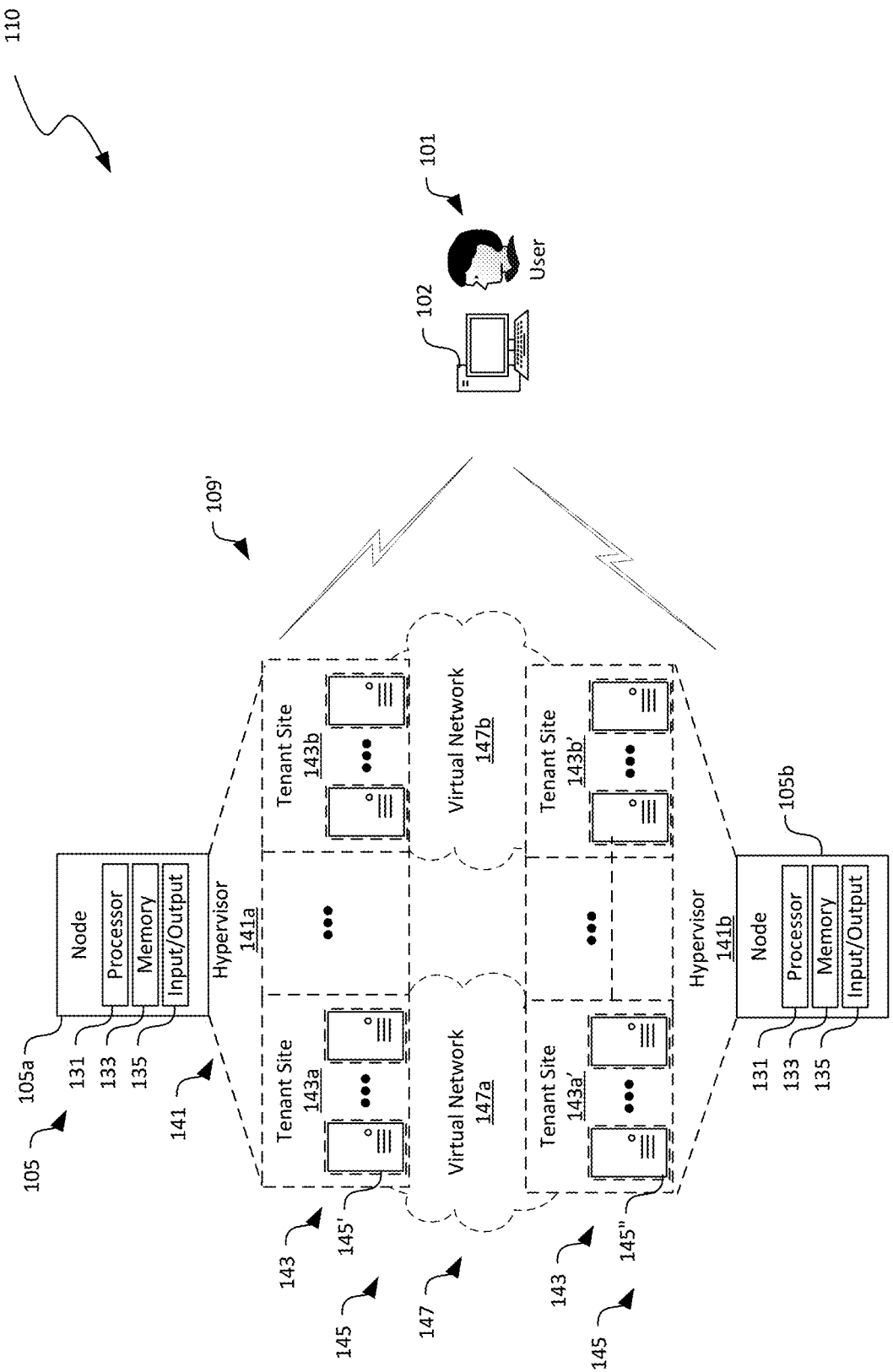
FIG. 2B is a schematic diagram illustrating certain hardware/software components of the cloud computing system in FIG. 2A in accordance with embodiments of the disclosed technology.

FIG. 2B is a schematic diagram illustrating an example overlay network 109' implemented on the underlay network 109 and suitable for the cloud computing system 110 of FIG. 2A in accordance with embodiments of the disclosed technology. In FIG. 2B, only certain components of the underlay network 109 of FIG. 2A are shown for clarity. As shown in FIG. 2B, a first node 105a and the second node 105b can each include a processor 131, a memory 133, and an input/output component 135 operatively coupled to one another. The processor 131 can include a microprocessor, a field-programmable gate array, and/or other suitable logic devices. The memory 133 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 6A-6D). The input/output component 135 can include a display, a touch screen, a keyboard, a mouse, a printer, and/or other suitable types of input/output devices configured to accept input from and provide output to an operator and/or an automated software controller (not shown).

The memory 133 of the first and second nodes 105a and 105b can include instructions executable by the processors 131 to cause the individual processors 131 to provide a hypervisor 141 (identified individually as first and second hypervisors 141a and 141b) and other suitable components (not shown). The hypervisors 141 can individually be configured to initiate, monitor, terminate, and/or otherwise locally manage one or more virtual machines 145 organized into tenant sites 143. For example, as shown in FIG. 2B, the first node 105a can provide a first hypervisor 141a that manages first and second tenant sites 143a and 143b, respectively. The second node 105b can provide a second hypervisor 141b that manages first and second tenant sites 143a' and 143b', respectively. The hypervisors 141 can be software, firmware, or hardware components. The tenant sites 143 can each include multiple virtual machines 145 or other suitable tenant instances for a particular user 101. For example, the first node 105a and the second node 105b can both host the tenant site 142a and 142a' for the user 101. The first node 105a and the second node 105b can both host the tenant site 143b and 143b' for the second user 101b (FIG. 1). Each virtual machine 145 can be executing a corresponding operating system, middleware, and/or applications.

Also shown in FIG. 2B, the cloud computing system 110 can include an overlay network 109' having one or more virtual networks 147 that interconnect the tenant sites 143a and 143b across multiple nodes 105. For example, a first virtual network 147a interconnects the first tenant sites 143a and 143a' at the first node 105a and the second node 105b. A second virtual network 147b interconnects the second tenant sites 143b and 143b' at the first node 105a and the second node 105b. Even though a single virtual network 147 is shown as corresponding to one tenant site 143, in other embodiments, multiple virtual networks 147 (not shown) may be configured to correspond to a single tenant site 143.

The virtual machines 145 on the virtual networks 147 can communicate with one another via the underlay network 109 (FIG. 2A) even though the virtual machines 145 are located on different nodes 105. Communications of each of the virtual networks 147 can be isolated from other virtual networks 147. In certain embodiments, communications can be allowed to cross from one virtual network 147 to another through a security gateway or otherwise in a controlled fashion. A virtual network address can correspond to one of the virtual machines 145 in a particular virtual network 147. Thus, different virtual networks 147 can use one or more virtual network addresses that are the same. Example virtual network addresses can include IP addresses, MAC addresses, and/or other suitable addresses.

In certain embodiments, the virtual machines 145 hosted on one or more of the nodes 105 can be utilized to perform one or more user requested tasks. In other embodiments, the virtual machines 145 or other suitable components of the cloud computing system 110 can also be utilized to implement a dispatcher service for the private cloud 106 (FIG. 1) or a service gateway for the public cloud 108 (FIG. 1). The dispatcher service can be configured to establish a servicing connection with the service gateway at the public cloud 108. The dispatcher service can also be configured to facilitate access to various computing services or computing resources at the private clouds 106 based on a list of access authorizations corresponding to the established servicing connection. In certain embodiments, the dispatcher service or the service gateway can be individually implemented as a cloud service, for example, by executing suitable instructions or code in one or more virtual machines 145 on selected nodes 105 in the computing fabric 115 (FIG. 2A). In other embodiments, dispatcher service and/or the service gateway can be provided by dedicated servers or via other suitable techniques. Example components and operations of the dispatcher service and connection service are described in more detail below with reference to FIGS. 3A-4B.

FIGS. 3A-3D are schematic diagrams illustrating certain hardware/software components of the hybrid cloud computing system 100 in FIG. 1 during certain stages of secure remote troubleshooting a private cloud from a public cloud. In FIGS. 3A-3D, certain components of the hybrid cloud computing system 100 are omitted for clarity. For example, only one private cloud 106 is shown in FIGS. 3A-3D for illustration purposes. Other and/or additional private clouds can have similar components and associated operations as those shown in FIGS. 3A-3D.

In addition, in FIGS. 3A-3D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 3A:
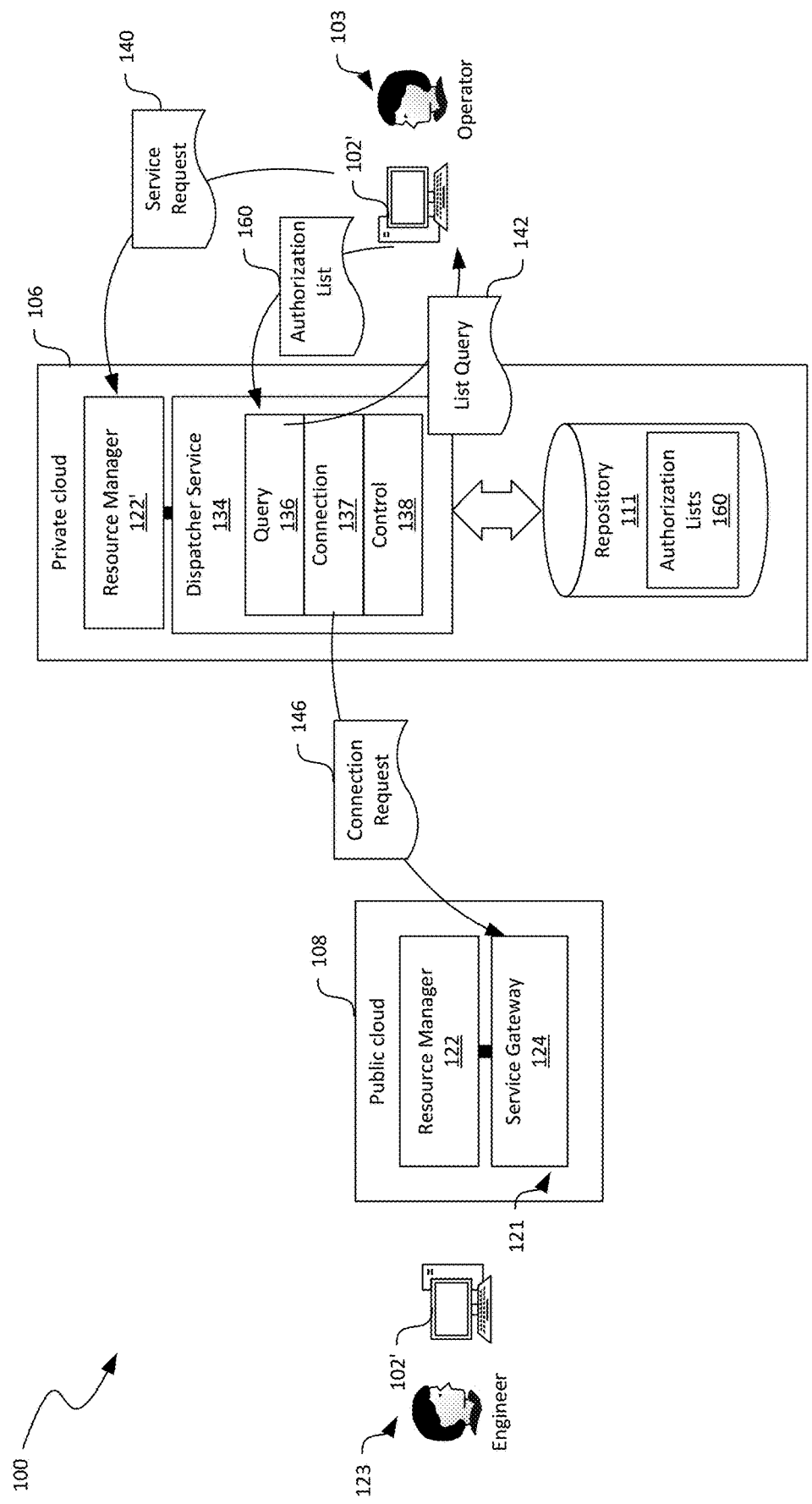
FIGS. 3A-3D are schematic diagrams illustrating certain hardware/software components of the hybrid cloud computing system in FIG. 1 during certain stages of secure remote troubleshooting of the private cloud from the public cloud in accordance with embodiments of the disclosed technology.

As shown in FIG. 3A, the public cloud 108 can include a resource manager 122 configured to facilitate management of various resources at the public cloud 108. The public cloud 108 can also include various resource providers 121 configured to provide the various resources. For example, in the illustrated embodiment, the public cloud 108 can include a service gateway 124 that is configured to facilitate establishment and operations of a servicing connection 107 (shown in FIG. 3B) with the private cloud 106. A "servicing connection" generally refers to a network connection associated with one or more servicing sessions in the private cloud 106. One example servicing connection can be established using the Secure Hypertext Transfer Protocol ("HTTPS"), HTTP over Transport Layer Security ("TLS"), or other suitable types of protocol. Though only the service gateway 124 is shown in FIG. 3A as a component of the public cloud 108, in other embodiments, the public cloud 108 can also include storage services, computing services, web services, database services, or other suitable types of resource providers.

The resource manager 122 can be configured to deploy, monitor, and/or manage resources in the public cloud 108 that is available to a subscriber (e.g., a user 101 in FIG. 1). The resource manager 122 can allow a subscriber to interact with available resources as a group. For example, the resource manager 122 can allow deployment, update, or deletion of one or more available resources in a coordinated operation. The resource manager 122 can also be configured to provide security, auditing, and tagging features to facilitate management of resources after deployment. Even though the public cloud 108 is shown in FIG. 3A as having the resource manager 122, in other embodiments, the resource manager 122 may be omitted. In such embodiments, a subscriber can manage various available resources in the public cloud 108 individually, separately, or in other suitable manners.

As shown in FIG. 3A, the private cloud 106 can include a resource manager 122' and a dispatcher service 134 operatively coupled to a repository 111 holding records of authorization lists 160. The resource manager 122' can be generally similar to that of the public cloud 108. For example, the resource manager 122' can be configured to facilitate the operator 103 to deploy, monitor, and/or manage resources in the private cloud 106. The repository 111 can include a network storage and associated data structures that are configured to store records of authorization list 160. The authorization lists 160 can individually include a list of access authorizations corresponding to a servicing connection 107 between the service gateway 124 and the dispatcher service 134, as described in more detail below.

The dispatcher service 134 can include several modules that are configured to facilitate establishment of the servicing connection 107 with the service gateway 124 at the public cloud 108 and operations performed by the engineer 123 at the public cloud 108 via the servicing connection 107. For example, as shown in FIG. 3A, the dispatcher service 134 can include a query module 136, a connection module 137, and a control module 138 operatively coupled to one another. In other examples, the dispatcher service 134 can also include interface, network, file storage, and/or other suitable types of modules.

The query module 136 can be configured to receive a service request 140 from the operator 103 of the private cloud 106. The service request 140 can be a request for troubleshooting a hardware/software issue on a node 105 (FIG. 2A) in the private cloud 106. In response to receiving the service request 140, the query module 136 of the dispatcher service 134 can be configured to authenticate the operator 103 and upon successful authentication, provide a list query 142 to the operator 103 for an authorization list 160 corresponding to the servicing connection 107 to be established for serving the service request 140. In one embodiment, the authorization list 160 can include a list of computing services (e.g., support services, admin services, etc.) or computing resources (e.g., servers, network storage devices, etc.) that an external entity (e.g., the engineer 123 at the public cloud 108) is allowed (or prohibited) to access via the servicing connection 107. For instance, when a particular node 105 in the private cloud 106 is experiencing technique issues, the operator 103 at the private cloud 106 can limit the access authorizations to the node 105 but prohibit access to any other nodes, servers, network devices, or other components of the private cloud 106.

Various techniques may be utilized to query the operator 103 at the private cloud 106. For instance, the dispatcher service 134 can be configured to provide a graphical user interface ("GUI") that provides a list of computing services or computing resources in the private cloud 106 as options for the operator 103. In turn, the operator 103 can select one or more of the provided options by, for example, clicking a check box next to an option. The operator 103 can then finalize the selection by actuating a button such as "Apply" or "Done" on the GUI. In other examples, the authorization list 160 can be provided as a configuration file, a text document, or in other suitable manners. In further examples, the operator 103 can submit the service request 140 with an authorization list 160 without being queried by the dispatcher service 134.

Upon receiving the authorization list 160 from the operator 103, the query module 136 of the dispatcher service 134 can be configured to store a copy of the authorization list 160 in the repository 111 and instruct the connection module 137 to initiate a call to the service gateway 124 at the public cloud 108 for establishing the servicing connection 107. The connection module 137 can also be configured to perform handshaking, authentication, or other suitable operations for establishing the servicing connection 107 with the service gateway 124. In certain embodiments, initiation of the servicing connection 107 can be one-directional. As such, the servicing connection 107 can be established with an outbound call by the connection module 137 with a connection request 146 to the service gateway 124 of the public cloud 108 but not in the reverse direction. The connection module 137 can be configured to deny any inbound requests from the service gateway 124 or other entities external to the private cloud 106 for establishing network connections with the private cloud 106.

In other embodiments, initiation of the servicing connection 107 can be bi-directional. For example, the dispatcher service 134 can receive a request (not shown) for establishing or reestablishing a servicing connection 107 from the service gateway 124. The connection module 137 of the dispatcher service 134 can authenticate the request via digital certificates, authorization tokens, or other suitable authentication credentials. Upon successful authentication, the connection module 137 of the dispatcher service 134 can allow the servicing connection 107 to be established with the service gateway 124 at the public cloud 108. In further embodiments, initiation of the servicing connection 107 can also be facilitated by a subscription service, a network service, an encryption service, or other suitable services at the private cloud 106.

Figure 3B:
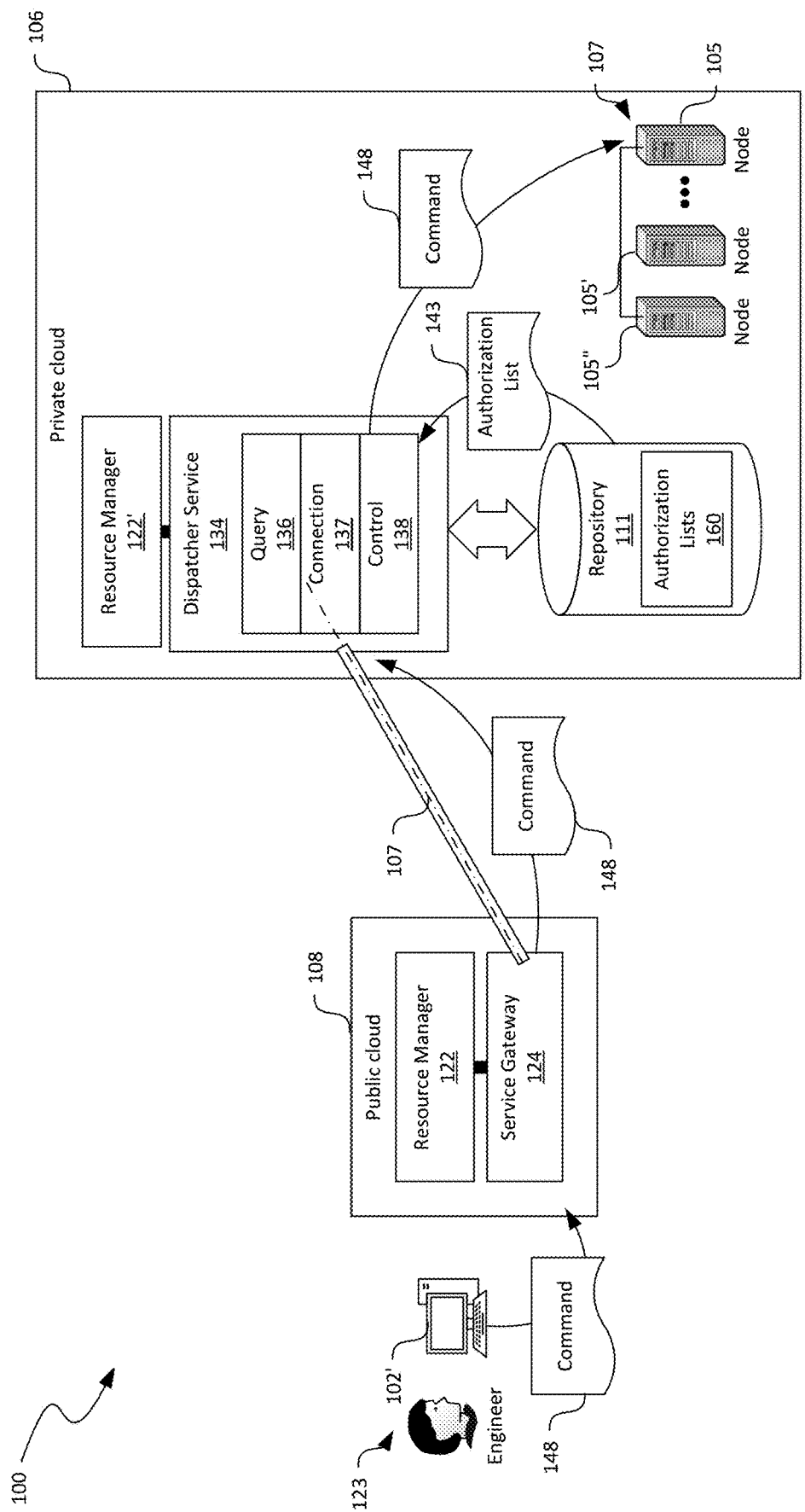

As shown in FIG. 3B, upon successful initiation, the service gateway 124 at the public cloud 108 can establish the servicing connection 107 with the dispatcher service 134 at the private cloud 106. An administrator, engineer, developer, technical support staff, or other suitable persons or entities (shown in FIG. 3B as an engineer 123 for illustration purposes) at the public cloud 108 can then utilize the established servicing connection 107 to troubleshoot one or more computing services or computing resources in the private cloud 107. For example, the engineer 123 at the public cloud 108 can transmit a command 148 (e.g., a ping) directed to a node 105 in the private cloud 106 to the dispatcher service 134 via the servicing connection 107.

In response, the control module 138 at the dispatcher service 134 can identity that the command 148 is received from the public cloud 108 via the servicing connection 107. In one implementation, identifying that the command 148 is received from the public cloud 108 via the servicing connection 107 includes inspecting a header of the received data of the command 148 for a header value indicating an identifier of the servicing connection 107. In other implementations, identifying that the command 148 is received from the public cloud 108 via the servicing connection 107 can include inspecting the data of the command 148 to identify a source, a destination, and a path between the source and destination to verify that the command 148 is received from the public cloud 108 to the private cloud 106 and via the servicing connection 107. In further implementations, identifying that the command 148 is received from the public cloud 108 via the servicing connection 107 can include applying other suitable network identification techniques.

The control module 138 can also be configured to retrieve an authorization list 160 corresponding to the servicing connection 107 according to, for instance, an identifier of the servicing connection 107 and determine whether access to the node 105 in the private cloud 106 is indicated in the retrieved authorization list 160 corresponding to the servicing connection 107. In one example, determining whether access to the computing service or computing resource to which the command 148 is directed is allowed includes determining whether access to the computing service or computing resource is indicated as being allowable in the retrieved authorization list 160. In other examples, the forgoing determination may be performed in other suitable manners.

In response to determining that access to the node 105 in the private cloud 106 is allowed according to the retrieved authorization list 160, the control module 138 of the dispatcher service 134 can be configured to identify a corresponding computing service or computing resource in the private cloud 106 and transmit the command 148 to, for example, the node 105 in the private cloud 106. Upon execution of the command 148 by the node 105, execution results 150 can be transmitted to the dispatcher service 134 and relayed by the control module 138 to the engineer 123 at the public cloud 108 via the servicing connection 107 and the servicing gateway 124.

As such, using the servicing connection 107, the engineer 123 at the public cloud 108 can perform diagnostics on the node 105 in the private cloud 106, perform repair actions such as modifying configurations on the node 105, install/reinstall software drivers, or rebooting the node 105. Thus, technical knowledge and expertise of the engineer 123 at the public cloud 108 can be leveraged to resolve technical issues at the private cloud 106 in a controlled manner.

Figure 3C:
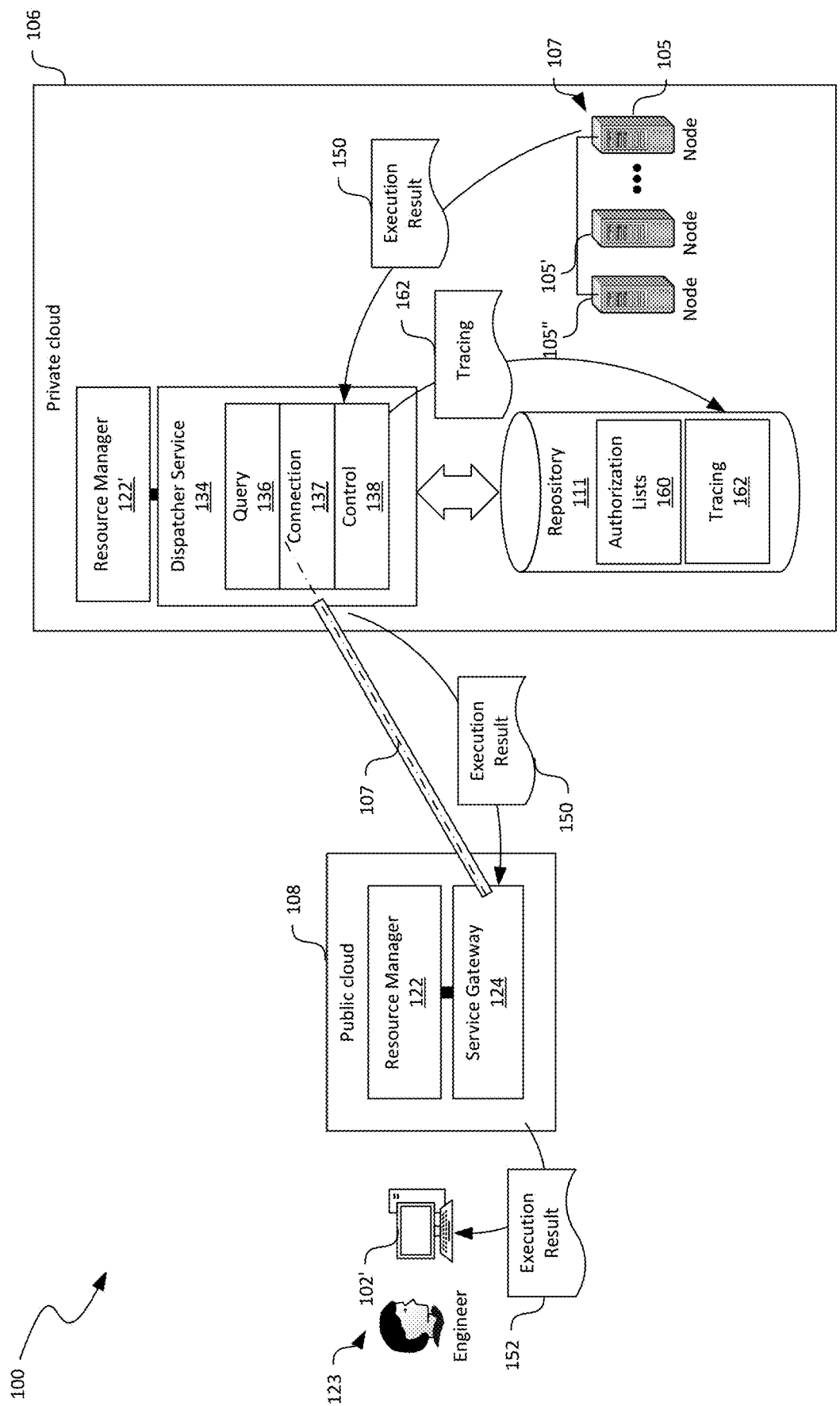

In certain implementations, the control module 138 of the dispatcher service 134 can also be configured to log all incoming and outgoing communications via the established servicing connection 107 until the servicing connection 107 is closed. For instance, as shown in FIG. 3C, the control module 138 of the dispatch service 134 can be configured to create records or "tracing" 162 of any received commands 148 to the node 105, results of access authorization determinations, and the execution results 150 transmitted to the public cloud 108 via the servicing connection 107. Such records or tracing 162 can be archived in, for instance, the repository 111 in the private cloud 106 or other suitable locations. The operator 106 of the private cloud 106 can then analyze the archived tracing 162 for auditing, maintenance, or other suitable uses.

Figure 3D:
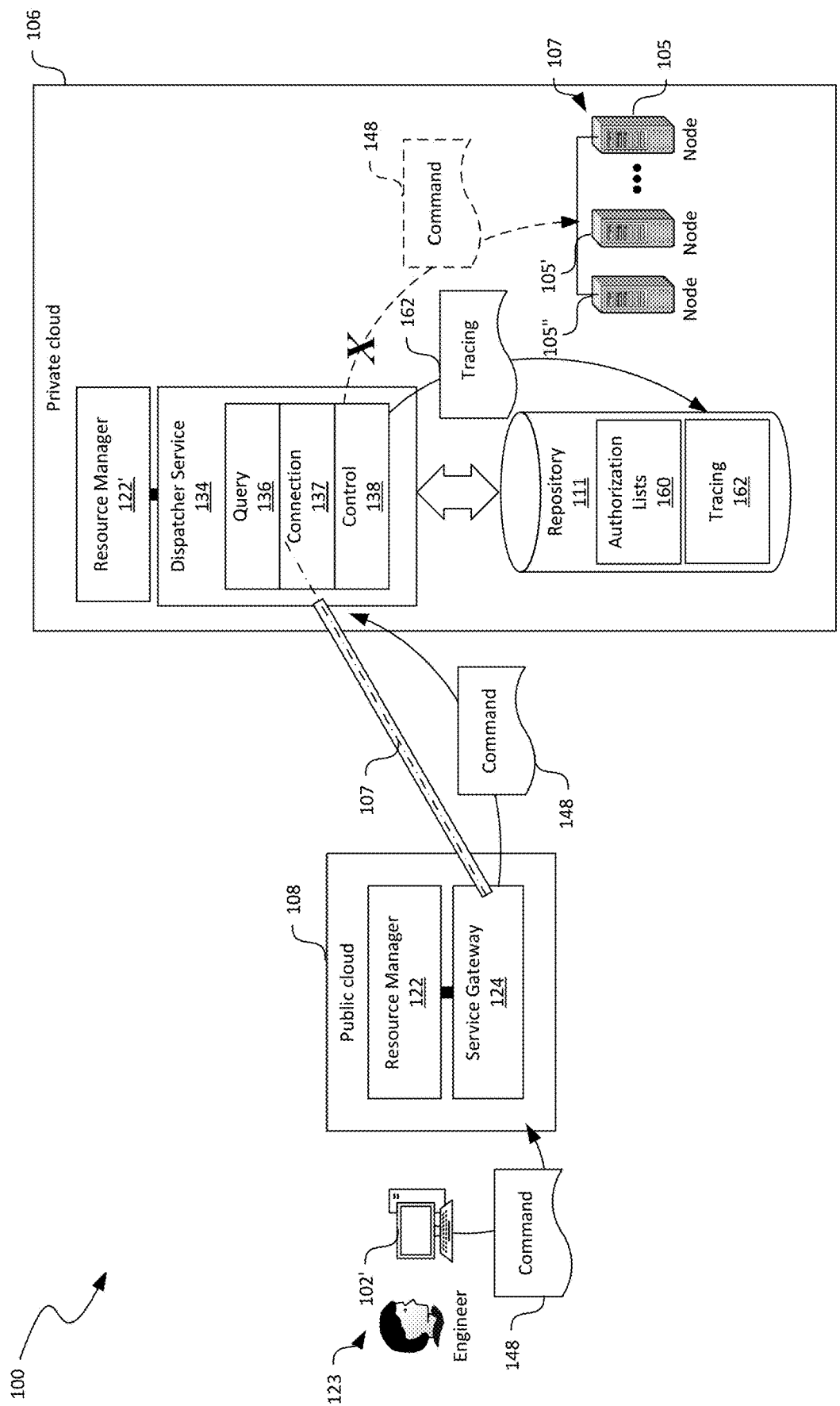

As shown in FIG. 3D, when the command 148 is directed to another node 105' but access to node 105' is not indicated in the retrieved authorization list 160, the control module 138 can be configured to discard the received command 148 to prevent access beyond what is indicated in the retrieved authorization list 160, as illustrated by dashed lines. As such, data security and privacy in the private cloud 106 can be efficiently controlled while allowing the sufficient remote access for troubleshooting issues in the private cloud 106 from the public cloud 108. In other examples, the control module 138 can also be configured to terminate the servicing connection 107 with the public cloud 108 in response to determining that access to the node 105' is not allowed, generate and store, at the private cloud 106, records (shown as tracing 162 in FIG. 3D) indicating the received command 148 and the unauthorized access to the computing service or computing resource in the private cloud 106, or perform other suitable operations.

Several embodiments of the disclosed technology can thus allow the operator 103 of the private cloud 106 to maintain control over data exchanged between the public cloud 108 and the private cloud 106 and a degree of privacy that is sacrificed in the private cloud 106 for troubleshooting issues in the private cloud 106. For example, by defining and limiting access to computing services or computing resources according to the authorization lists 160, the operator 103 of the private cloud 106 can limit a scope of access by the engineer 123 of the public cloud 108. Using the authorization lists 160, the dispatcher service 134 can prevent execution of commands 148 directed to non-authorized computing services or computing resources. As such, the operator 103 of the private cloud 106 can leverage expertise of the engineer 123 of the public cloud 108 on a per-need basis while avoid giving full control of the private cloud 106 to the engineer 123 of the public cloud 108.

Figure 4A:
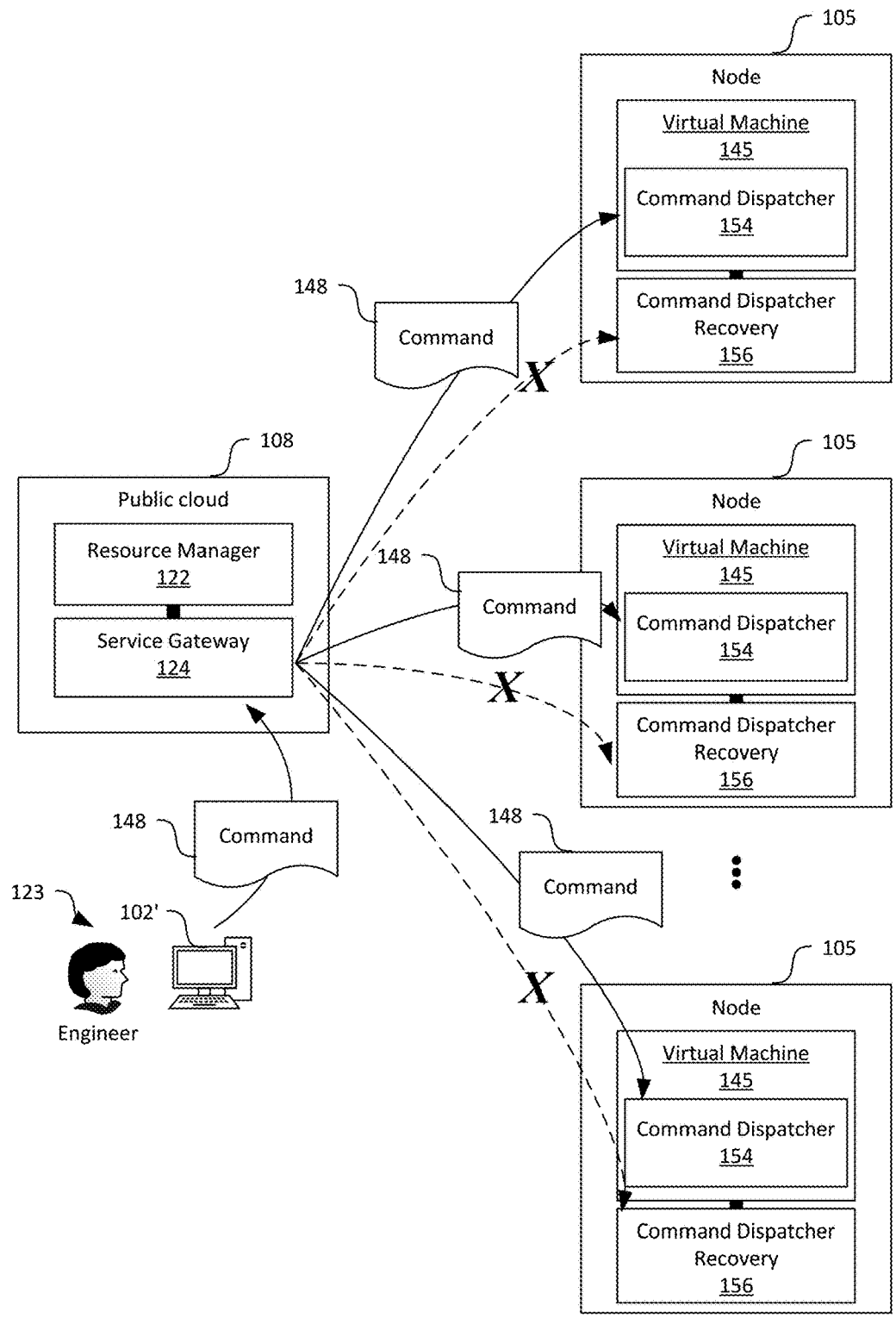
FIGS. 4A and 4B are schematic diagrams illustrating certain example hardware/software components of a cloud computing system cloud in accordance with embodiments of the disclosed technology.
Figure 4B:
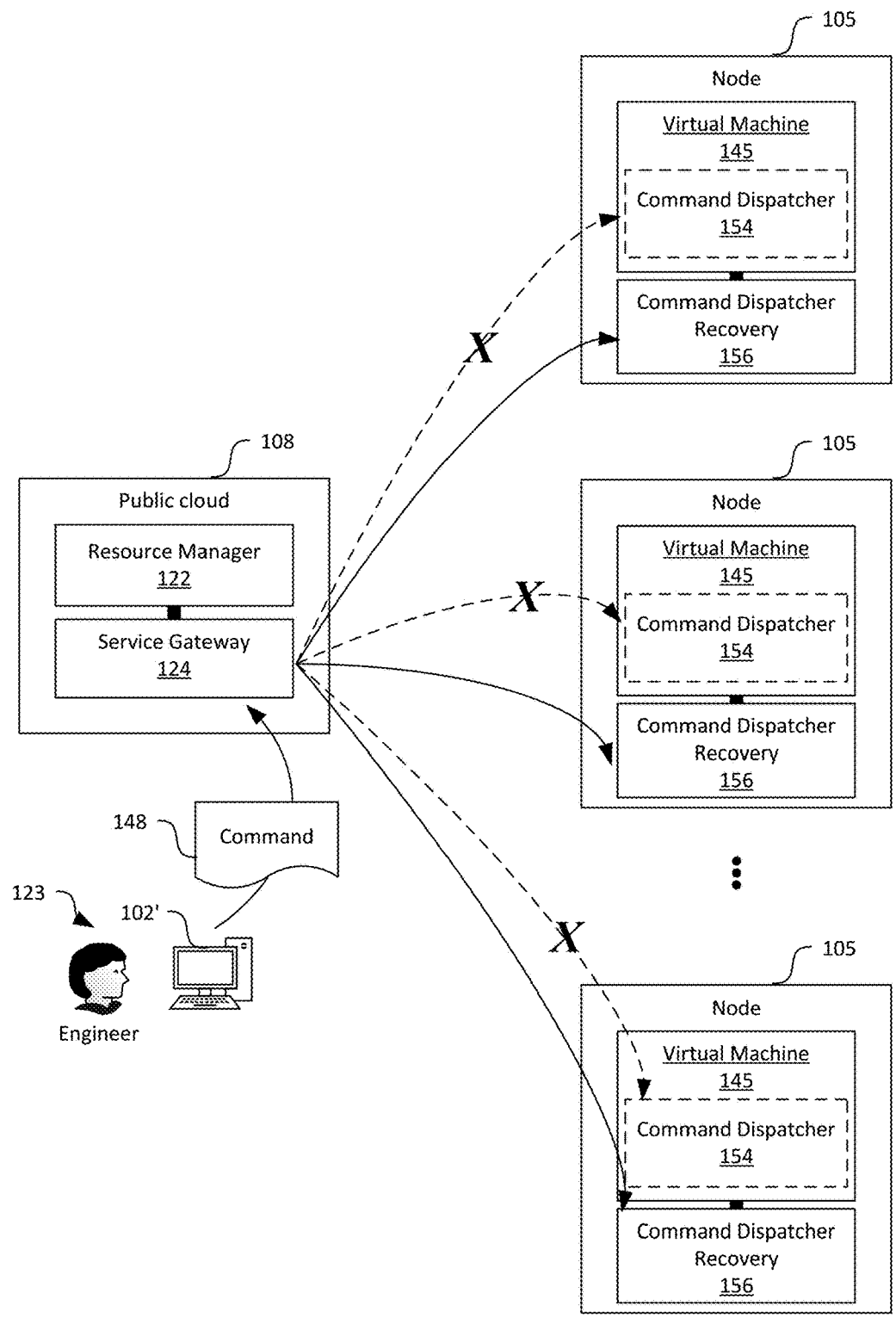

In certain implementations, repair functionalities and corresponding computing services can be activated in layers or sequences on the nodes 105 in the private cloud 106. For example, as shown in FIG. 4A, a command dispatcher 154 can be executed in a virtual machine 145 on the nodes 105 in the private cloud 106 to receive and execute commands 148 from the public cloud 108. However, in certain situations, the command dispatcher 154 may be unavailable due to virtual machine error or other hardware/software issues on the nodes 105. To address such situations, a command dispatcher recovery service 156 can be placed on the nodes 105 (or virtual machines hosted thereon). The command dispatcher recovery service 156 can be pre-configured with a list of endpoints (e.g., the service gateway 124 in FIG. 3A) to connect to. In operation, the command dispatcher recovery service 156 can reach outside of the nodes 105 when the command dispatcher 154 is offline, as shown in FIG. 4B. As such, the engineer 123 of the public cloud 108 can first recover the command dispatcher 154 using the command dispatcher recovery service 156, and then use the command dispatcher 154 for other diagnostic or repair operations.

In the cloud architecture described above with reference to FIGS. 3A-4B, the engineer 123 from the public cloud 108 was used as an example entity granted access by the operator 103 of the private cloud for accessing certain computing services and/or computing resources in the private cloud. In other example implementations, multiple entities may be granted granular authorizations for performing various troubleshooting tasks via the public cloud 108. For instance, a technical support staff (not shown) from the public cloud 108 may be granted authorization to access an application executing on a node 105 in the private cloud 106 while the engineer 123 may be granted authorization to access a device driver, a virtual machine, a container, or an operating system on the node 105 in addition to access to the application.

In certain embodiments, the foregoing granular access can be based on login credential of the engineer 123, the technical support staff, or other suitable types of entities to the public cloud 108. In other embodiments, the foregoing granular access can be based on a subscription level of an entity to the public cloud 108. The entity can be an entity of the private cloud 106 or the public cloud 108. For example, a technician of the private cloud 106 can have a subscription to a cloud service at the public cloud 108 through which the technician can access the private cloud 106 via the servicing connection 107. Based on the subscription level of the technician to the public cloud 108 and the identifier of the servicing connection 107, the dispatcher service 134 can be configured to retrieve an authorization list 160 corresponding to the subscription level from the repository 111. The retrieved authorization list 160 can allow the technician access to, for example, a resource group, a resource type, or a single resource instance at the private cloud 106 via the public cloud 108 and the servicing connection 107. For a different entity (e.g., an engineer) who has a different subscription to the public cloud 108, the dispatcher service 134 can retrieve a different authorization list 160. As such, access to the private cloud 106 via the public cloud 108 and the servicing connection 107 can be granularized based on the subscription levels of entities to the public cloud 108. In other embodiments, such granularization can also be based on an identity, a role, or other suitable characteristics of the entities accessing the private cloud 106 via the public cloud 108 in addition to or in lieu of the subscription level.

Figure 5A:
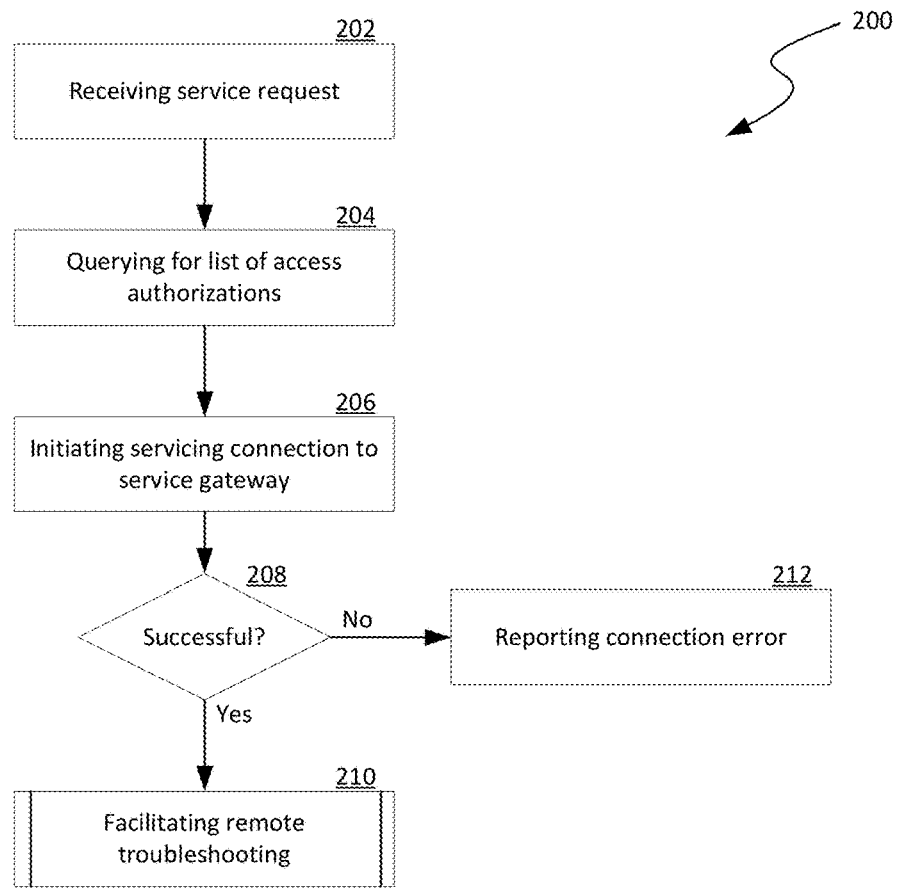
FIGS. 5A and 5B are flowcharts illustrating processes of secure remote troubleshooting of the private cloud from the public cloud in accordance with embodiments of the disclosed technology.
Figure 5B:
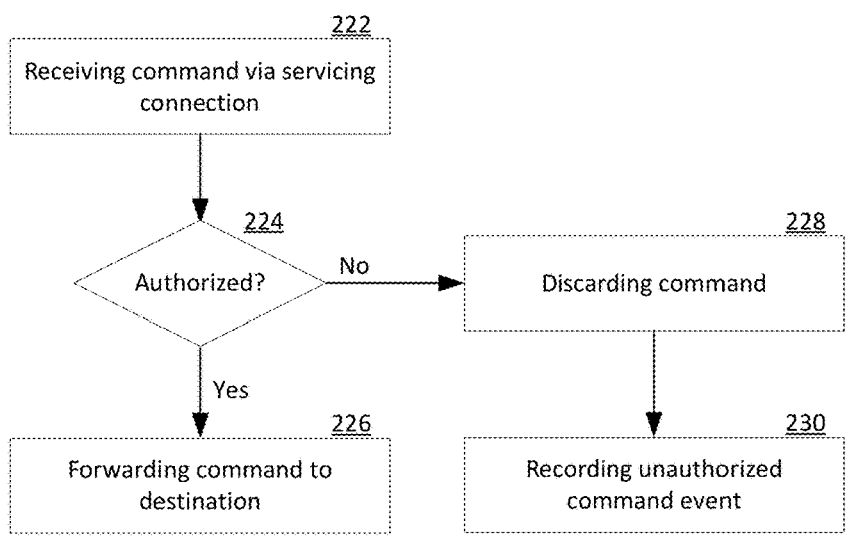

FIGS. 5A and 5B are flowcharts illustrating processes of secure remote troubleshooting of the private cloud from the public cloud in accordance with embodiments of the disclosed technology. Even though the processes are described below with reference to the hybrid cloud computing system 100 of FIGS. 1-4B, in other embodiments, embodiments of the processes can be performed in other computing systems with additional and/or different components.

As shown in FIG. 5A, a process 200 can include receiving a service request at a private cloud at stage 202. The process 200 can also include querying for a list of access authorizations at stage 204. The list of access authorizations can include data indicating a subset of computing services or computing resources that are allowed to be accessed corresponding to the service request. The process can then include initiating a servicing connection between the private cloud and a public cloud at stage 206. The initiation of the servicing connection can be unidirectional or bi-directional, as discussed above with reference to FIGS. 3A-3D. The process 200 can then include a decision stage 208 to determine whether the servicing connection is successfully established. In response to determining that the servicing connection is successfully established, the process 200 proceeds to indicating that the servicing connection is ready for use to serve the service request and facilitating remote troubleshooting using the servicing connection at stage 210. Example operations of facilitating remote troubleshooting are described in more detail below with reference to FIG. 5B. Otherwise, the process 200 proceeds to reporting a connection error at stage 212.

FIG. 5B is a flowchart illustrating example operations of facilitating remote troubleshooting the private cloud using the servicing connection established according to the process 200 in FIG. 5A. As shown in FIG. 5B, the operations can include receiving a command at the private cloud via the servicing connection at stage 222. The operations can then include a decision stage 224 to determine whether the command is authorized based on a list of access authorizations. Examples of performing such a determination are described above with reference to FIGS. 3A-3D. In response to determining that the command is authorized, the operations proceed to forwarding the command to a destination such as a computing service or computing resource in the private cloud at stage 226. Otherwise, the operations proceed to discarding the command at stage 228 and recording the unauthorized command event at stage 230.

Figure 6:
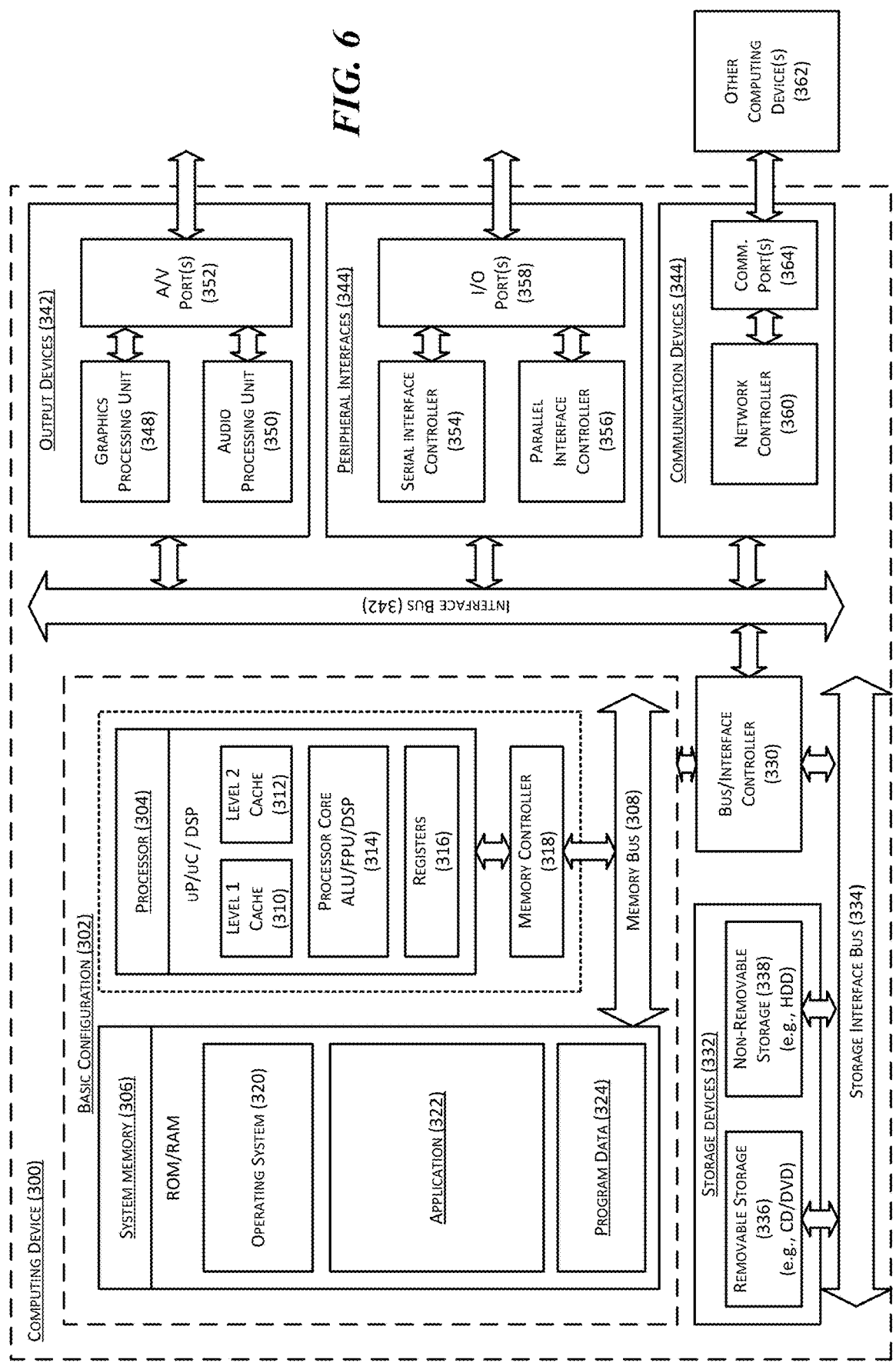
FIG. 6 is a computing device suitable for certain components of the hybrid cloud computing system in FIG. 1.

FIG. 6 is a computing device 300 suitable for certain components of the hybrid cloud computing system 100 in FIG. 1. For example, the computing device 300 can be suitable for the nodes 105 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of secure remote troubleshooting of a private cloud from a public cloud via a computer network, the method comprising:

receiving, from an operator of the private cloud, a first request for a first servicing connection with the public cloud, wherein the private cloud is configured to reject a second request for a second servicing connection sent from the public cloud to the private cloud;

querying, based at least in part on the first request, the operator of the private cloud for an access authorization indicating a computing service or a computing resource in the private cloud that is accessible from the public cloud via the first servicing connection;

receiving, from the operator of the private cloud, a response that includes the access authorization;

establishing, based at least in part on the response that includes the access authorization, the first servicing connection between the private cloud and the public cloud; and providing, via the first servicing connection, a command to be executed by the computing service or the computing resource in the private cloud, wherein the command enables the secure remote troubleshooting of the private cloud from the public cloud.

2. A computing device in a private cloud interconnected to a public cloud via a computer network, the computing device comprising:

a processor; and a memory operatively coupled to the processor, the memory having instructions executable by the processor to cause the computing device to:

send an outbound request for a first servicing connection with the public cloud, wherein:

the outbound request includes an access authorization indicating a computing service or a computing resource in the private cloud that is accessible from the public cloud via the first servicing connection; and the private cloud is configured to reject an inbound request for a second servicing connection sent from the public cloud to the private cloud;

establish, based at least in part on the outbound request, the first servicing connection with the public cloud;

receive, from the public cloud, a command to be executed for secure remote troubleshooting of the computing service or the computing resource in the private cloud;
identify that the command is received via the first servicing connection with the public cloud; and
determine, based on the access authorization, that access to the computing service or the computing resource to which the command is directed is allowed from the public cloud via the first servicing connection.

3. The computing device of claim 2, wherein the memory includes additional instructions that are executable by the processor to cause the computing device to:
forward the command to the computing service or the computing resource in the private cloud to be executed in the private cloud to generate data representing execution results; and
transmit, from the private cloud to the public cloud, the data representing the execution results of executing the command in the private cloud, thereby allowing an entity external to the private cloud to perform diagnostics or repair in the private cloud.

4. The computing device of claim 2, wherein identifying the command inspects a header of data for a header value indicating an identifier of the servicing connection.

5. The computing device of claim 4, wherein:
the memory includes additional instructions that are executable by the processor to cause the computing device to retrieve, from a network storage in the private network, a list of access authorizations corresponding to the first servicing connection according to the identifier of the first servicing connection; and
to determine that access to the computing service or the computing resource to which the command is directed is allowed includes determining that the computing service or the computing resource is included in the list of access authorizations.

6. The computing device of claim 5, wherein:
the computing service or the computing resource is a first computing service or a first computing resource hosted in the private cloud;
the command is a first command directed to the first computing service or the first computing resource; and
the memory includes additional instructions that are executable by the processor to cause the computing device to:
determine that the first computing service or the first computing resource is offline in the private network; and
in response to determining that the first computing service or the first computing resource is offline, modify the list of access authorizations to allow access to a second computing service or a second computing resource hosted in the private cloud via the first servicing connection, the second computing service or the second computing resource being configured to recover the first computing service or the first computing resource.

7. The computing device of claim 2, wherein the memory includes additional instructions that are executable by the processor to cause the computing device to display a graphical user interface that provides a list of computing services or computing resources in the private cloud as selectable options for the secure remote troubleshooting.

8. A method of secure remote troubleshooting of a private cloud from a public cloud via a computer network, the method comprising:
sending, by an operator of the private cloud, an outbound request for a first servicing connection with the public cloud, wherein:
the request includes an access authorization indicating a first computing service or resource in the private cloud that is accessible from the public cloud via the first servicing connection; and
the private cloud is configured to reject an inbound request for a second servicing connection sent from the public cloud to the private cloud;
establishing, based at least in part on the outbound request, the first servicing connection between the private cloud and the public cloud;
receiving, via the first servicing connection, a command directed to a second computing service or resource in the private cloud;
determining, based at least in part on the access authorization indicating the first computing service or resource in the private cloud that is accessible from the public cloud via the first servicing connection, that access to the second computing service or resource to which the command is directed is not allowed from the public cloud via the first servicing connection; and
in response to determining that access to the second computing service or resource to which the command is directed is not allowed from the public cloud via the first servicing connection, preventing the command from being executed in the private cloud, thereby avoiding unauthorized access to the second computing service or resource in the private cloud.

9. The method of claim 8, further comprising:
in response to determining that access to the second computing service or resource to which the command is directed is not allowed from the public cloud via the first servicing connection, terminating the first servicing connection; and
storing, at the private cloud, records indicating unauthorized access to the second computing service or resource.

10. The method of claim 8, further comprising inspecting a header of data for a header value indicating an identifier of the first servicing connection.

11. The method of claim 8, further comprising:
determining that the first computing service or resource is offline in the private network; and
in response to determining that the first computing service or resource is offline, modifying a list of access authorizations to allow access to a third computing service or resource via the first servicing connection, the third computing service or resource being configured to recover the first computing service or resource.

12. The method of claim 8, further comprising causing a graphical user interface that provides a list of computing services or resources in the private cloud as selectable options for the secure remote troubleshooting to be displayed.

* * * * *